(12) United States Patent
Nicholas

(10) Patent No.: US 7,529,265 B1
(45) Date of Patent: May 5, 2009

(54) FREQUENCY SELF-ORGANIZING RADIO NETWORK SYSTEM AND METHOD

(75) Inventor: David C. Nicholas, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1247 days.

(21) Appl. No.: 10/308,948

(22) Filed: Dec. 3, 2002

(51) Int. Cl.
   *H04L 12/413* (2006.01)
(52) U.S. Cl. ............... 370/445; 370/330; 455/452.2
(58) Field of Classification Search ........ 370/330, 370/336, 337, 343, 344, 345, 347, 436, 437, 370/445, 447, 448, 458, 459, 461, 462; 455/450, 455/451, 452.1, 452.2, 509
See application file for complete search history.

(56) References Cited

U.S. PATENT DOCUMENTS

| | | | | |
|---|---|---|---|---|
| 4,937,822 A | * | 6/1990 | Weddle et al. | 370/436 |
| 5,093,927 A | * | 3/1992 | Shanley | 455/513 |
| 5,448,753 A | * | 9/1995 | Ahl et al. | 455/422.1 |
| 5,453,987 A | * | 9/1995 | Tran | 370/447 |
| 5,570,355 A | * | 10/1996 | Dail et al. | 370/352 |
| 6,034,966 A | * | 3/2000 | Ota | 370/443 |
| 6,259,915 B1 | * | 7/2001 | Raith | 455/434 |
| 6,307,862 B1 | * | 10/2001 | Silverman | 370/442 |
| 6,456,633 B1 | * | 9/2002 | Chen | 370/490 |
| 6,532,369 B1 | * | 3/2003 | Myer | 455/517 |
| 6,788,702 B1 | * | 9/2004 | Garcia-Luna-Aceves et al. | 370/458 |
| 6,847,678 B2 | * | 1/2005 | Berezdivin et al. | 375/146 |
| 6,973,059 B1 | * | 12/2005 | Borst et al. | 370/330 |
| 6,980,561 B1 | * | 12/2005 | Abi-Nassif | 370/458 |
| 6,980,810 B1 | * | 12/2005 | Gerakoulis et al. | 455/450 |
| 7,002,933 B1 | * | 2/2006 | Poon et al. | 370/315 |
| 7,023,833 B1 | * | 4/2006 | Aiello et al. | 370/348 |
| 7,123,624 B1 | * | 10/2006 | Margon | 370/445 |
| 7,197,318 B2 | * | 3/2007 | Schwarz et al. | 455/453 |
| 2002/0054574 A1 | * | 5/2002 | Beach et al. | 370/279 |
| 2002/0059408 A1 | * | 5/2002 | Pattabhiraman et al. | 709/223 |
| 2002/0061031 A1 | * | 5/2002 | Sugar et al. | 370/466 |
| 2002/0071413 A1 | * | 6/2002 | Choi | 370/337 |
| 2002/0093929 A1 | * | 7/2002 | Mangold et al. | 370/336 |
| 2002/0105930 A1 | * | 8/2002 | Sydon et al. | 370/337 |
| 2003/0012166 A1 | * | 1/2003 | Benveniste | 370/338 |
| 2004/0028011 A1 | * | 2/2004 | Gehring et al. | 370/330 |
| 2006/0062240 A1 | * | 3/2006 | Meier | 370/448 |
| 2006/0116129 A1 | * | 6/2006 | Gorsuch | 455/452.2 |

* cited by examiner

*Primary Examiner*—Chi H. Pham
*Assistant Examiner*—Kevin Mew

(57) ABSTRACT

A system and method of determining an available frequency sub-band for radio traffic in a multiple node radio network is disclosed. The method and system provide for communication over a radio frequency band, the radio frequency band comprising radio frequency sub-bands and providing a radio node group of at least one radio communications devices configured to broadcast and receive on the radio frequency band. The system and method create a time for a window of radio broadcast silence on at least one of the radio frequency sub-bands by the radio node group. The system and method survey the at least one of the radio frequency sub-bands during the window of radio broadcast silence. The system and method choose, based on the survey, a radio frequency sub-band for broadcast from the radio frequency band.

21 Claims, 2 Drawing Sheets

FREQUENCY SELF-ORGANIZING RADIO NETWORK SYSTEM AND METHOD

BACKGROUND

Military and other conventional radio networks may be short on frequencies and long on the need to pre-plan frequency requirements before deployments. This problem has been addressed by creating radio systems that are self-organizing in frequency and time. Such a system would first survey the frequencies available upon deployment at a location, then self-organize among the radios at that location to use the frequencies available. In order to prevent interference to and from friendly users and/or prevent interference from unfriendly users, ongoing spectrum surveillance is then required to "see and avoid" other friendly users which appear on the chosen frequencies after the radio begins transmission.

In a fashion somewhat analogous to ordinary conversation, in a radio system one cannot hear clearly when one is talking on the same frequency and one cannot clearly hear one talker when two talkers are on the same frequency. Moreover, radio signals are of widely varying strengths. One especially cannot hear a weak talker when a strong talker is on the same frequency. Moreover, not all users use a frequency all the time. Moreover, in a radio network nearby transmitters even if on different, but nearby, frequencies often emit enough unintended noise in adjacent, or nearby, channels to overwhelm weak signals from distant users on the correct frequency.

Accordingly, in the design of a radio communications system it is common to plan for the operation of the radio system in a band or bands of the frequency spectrum which are licensed in a particular geographic area of interest using a particular format for the over-the-air signal which is acceptable to the licensing authority for a particular category of user. Before actual operation the user obtains a license from the licensing authority allowing the user to operate on a particular frequency, or frequencies, at a specific location, perhaps with a specific antenna height, probably with a power limitation, using a particular over-the-air format. This licensing process is designed to coordinate the use of the spectrum between users and prevent interference by one user with another.

Mobile military deployments in a friendly environment typically are assigned by the administrative authority to large bands of frequencies reserved for military use. Within these bands the military administers its own frequency assignments to a greater extent than that permitted civilian users, but the frequency coordination problem is no less complex. The military planner, while not using a licensing procedure, is confronted with the same planning problem. The problem is exacerbated by the use of more and more radio equipment and the need for faster and faster deployments and military response times. The problem is further complicated with foreign deployments and the need to coordinate spectrum with other countries' military forces, and friendly foreign civilian users.

It is conventional in military applications to listen to enemy transmissions. It is also conventional in civilian applications to characterize the interference environment. For example, at sites that test radio equipment for undesired emissions, it is common to catalog other interfering emissions in the area. It is also conventional to listen before talking. Human radio operators are perhaps the best example, but automatic systems in the ISM band do this as well, and Carrier Sense Multiple Access (CSMA) systems obviously listen before individual transmissions. In frequency "hopping" systems it is also conventional to avoid certain frequencies with conflicts which are known a priori. However, systems do not conventionally operate in which the system self-organizes in frequency, and dynamically changes its own frequency assignments based on ongoing surveillance, while giving the appearance of continuous operation. The apparently continuous waveform of the inventive radio system will require coordinated periods of silence system-wide to listen for non-system users, and new system users. System wide silence is preferred on a band or sub-band of frequencies within the operating band which is sufficiently wide to permit effective surveillance and detection of non-system users or non-system interference, without interference from, perhaps strong, system users adjacent to the silenced band of frequencies. The periods of silence may be moved cryptographically in time and frequency to improve performance of the system.

Accordingly, there is a need for a radio system and method that self-organizes in frequency and in which a repeated silent period may be used to detect traffic on the frequency band that is being used by the radio network. There is also a need for a radio system and method in which a silent period may be repeatedly used over a sub-band of the band of frequencies on which a radio system is operating to detect traffic on the sub-band.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

An example of the invention relates to a method of determining an available frequency sub-band for radio traffic in a multiple node radio network. The method includes providing for communication over a radio frequency band the radio frequency band comprising radio frequency sub-bands and providing a radio node group of at least one radio transmitter device configured to broadcast and at least one radio receiver device configured to receive on the radio frequency band. The method also includes creating a time for a window of radio broadcast silence on at least one of the radio frequency sub-bands by the radio node group. Further, the method includes surveying the at least one of the radio frequency sub-bands during the window of radio broadcast silence. Further still, the method includes choosing, based on the survey, a radio frequency sub-band for broadcast from the radio frequency band.

Another example of the invention relates to a radio system. The radio system includes more than one radio node configured to broadcast and receive over more than one frequency sub-band. The frequency sub-bands make up a frequency band. Each radio node includes a radio frequency communication device and a radio controller. The controller is configured to provide a repeated silent period, and provide surveillance of the frequency sub-bands to which the transmission silence has been applied.

A further example of the invention relates to a method of detecting use of a band of frequencies by a second group of radio devices where there is a network of radio communications devices forming a first group which use a band of frequencies. The method includes stopping repeatedly and substantially simultaneously, transmissions by the first group, for a time period, on at least one sub-band of the band of frequencies. The method also includes surveying the at least one sub-band of the band of frequencies. Further, the method includes determining whether there is traffic on the at least one sub-band of the band of frequencies.

Yet a further example of the invention relates to a method of modifying a carrier sense multiple access (CSMA) protocol used in a node in a first group of radio nodes each using the CSMA protocol to avoid interference to or from a second group of radio nodes which do not use the CSMA protocol. The method includes listening on the first frequency band for transmission traffic by neighboring radio nodes using the CSMA protocol. The method also includes identifying, during the same listening period, radio traffic on the first frequency band from a second group of one or more radio nodes which do not use the CSMA protocol.

Alternative examples and other exemplary embodiments relate to other features and combination of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF PREFERRED AND EXEMPLARY EMBODIMENTS

Figure 1:
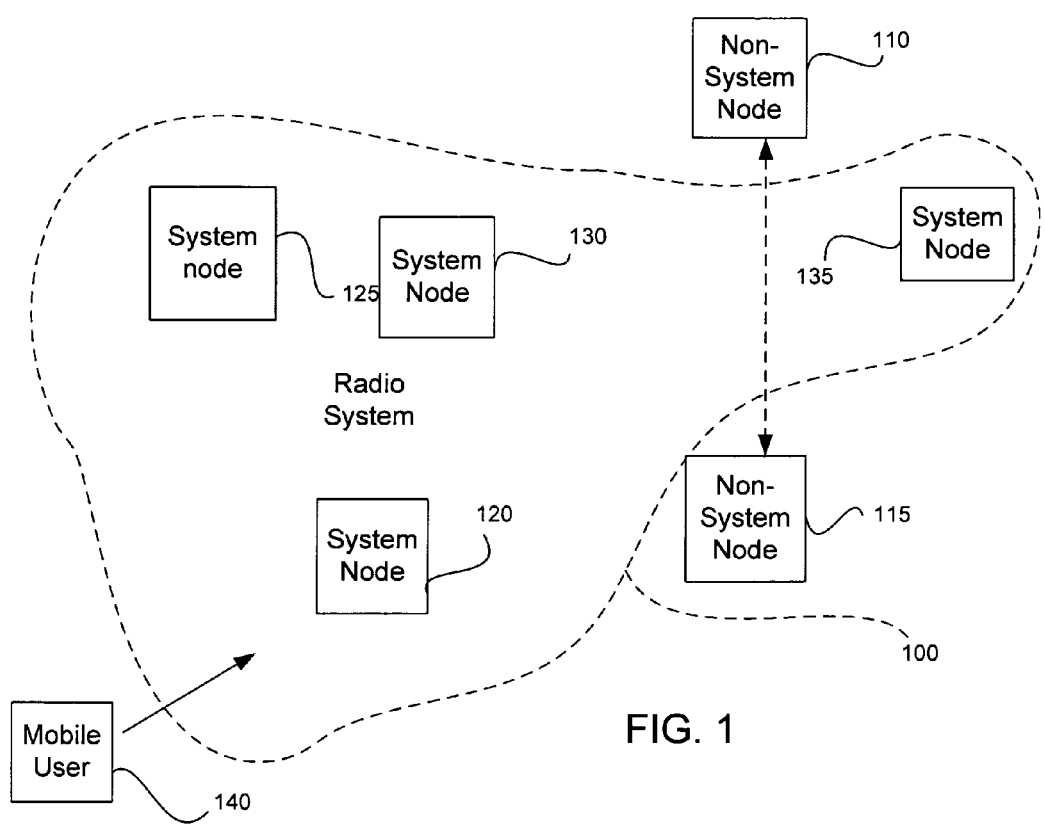
FIG. 1 is an exemplary block diagram of a radio system using the invention recited in the claims and showing users which are not part of the system.

Before describing, in detail, the particular improved system and method, it should be observed that the invention includes, but is not limited to a novel structural combination of conventional data/signal processing components and communications circuits, and not in the particular detailed configurations thereof. Accordingly, the structure, methods, functions, control and arrangement of conventional components and circuits have, for the most part, been illustrated in the drawings by readily understandable block representations and schematic diagrams, in order not to obscure the disclosure with structural details that will be readily apparent to those skilled in the art, having the benefit of the description herein. Further, the invention is not limited to the particular embodiments depicted in the exemplary diagrams, but should be construed in accordance with the language in the claims.

As described herein, a repeated window of silence, in time, or frequency, or both, is provided in the transmissions of a radio system comprising radio nodes during which the system performs a spectrum surveillance function to detect attempts by other radio users, not part of the system, to use the same frequencies. If other users are detected, the system can then automatically move to a different frequency. Such a system can therefore be deployed without pre-planning the frequencies to be used. The need for a repeated or periodic silent window during ongoing operation to permit ongoing surveillance to "hear and avoid" other users, especially other intermittent users, has not been previously recognized.

In an exemplary embodiment, radio nodes, such as node 120 of FIG. 1, may include a transmitter, a receiver, and/or a transceiver for broadcast and/or reception over the frequency band. The apparatus may be controlled by a controller which in a preferred embodiment would consist of a processor, a memory, and a program in the memory controlling the processor, but those skilled in the art will recognize that in some situations a sequential machine composed of individual logic gates and memory elements, or larger integrated circuits could be used, etc. Further, a user interface and user input/output devices, such as but not limited to, a speaker, a microphone, a keyboard, and/or a terminal for data communication may also be included.

The system shutdown must be substantially simultaneous, wherein there is sufficient overlap of the shutdown periods of all the nodes that the period where all nodes are silent is large enough to perform surveillance, and surveillance is conducted within that period. When a given node shuts down to perform surveillance, surveillance will not start until considering clock accuracy and synchronization uncertainties which apply to that particular implementation, all other nodes can be certain to have shutdown as well. Similarly, surveillance will end before any node may have started up considering the same uncertainties in that particular implementation.

A radio system 100 is configured to listen to the spectral environment in which it is deployed, and then self-organize in frequency to avoid interference to, and from, existing non-system users 110 and 115.

Ongoing surveillance of frequencies not in use by system 100 requires that the now-operating system 100 stop transmitting for a period of time to permit the system nodes 120, 125, 130, and 135 to listen for new, non-system users 110 and 115 which have begun transmissions since the last listening period. System 100 also listens for new system 100 users which were silent, or mobile system users 140 who were previously out of range. Because of spurious transmitter emissions, frequencies nearby to the frequency to be surveyed must also be shutdown, so this shutdown must be coordinated across all the system user nodes. In order to provide the appearance of continuous operation, this shutdown window must be a pre-planned, short portion of the radio system waveform.

The window or period of silence is a previously unrecognized method of conducting successful surveillance and may be beneficial for the operation of a self-organizing radio system.

The silent period need not be strictly periodic, but may be moved around cryptographically to provide added security and fault tolerance.

Figure 2:
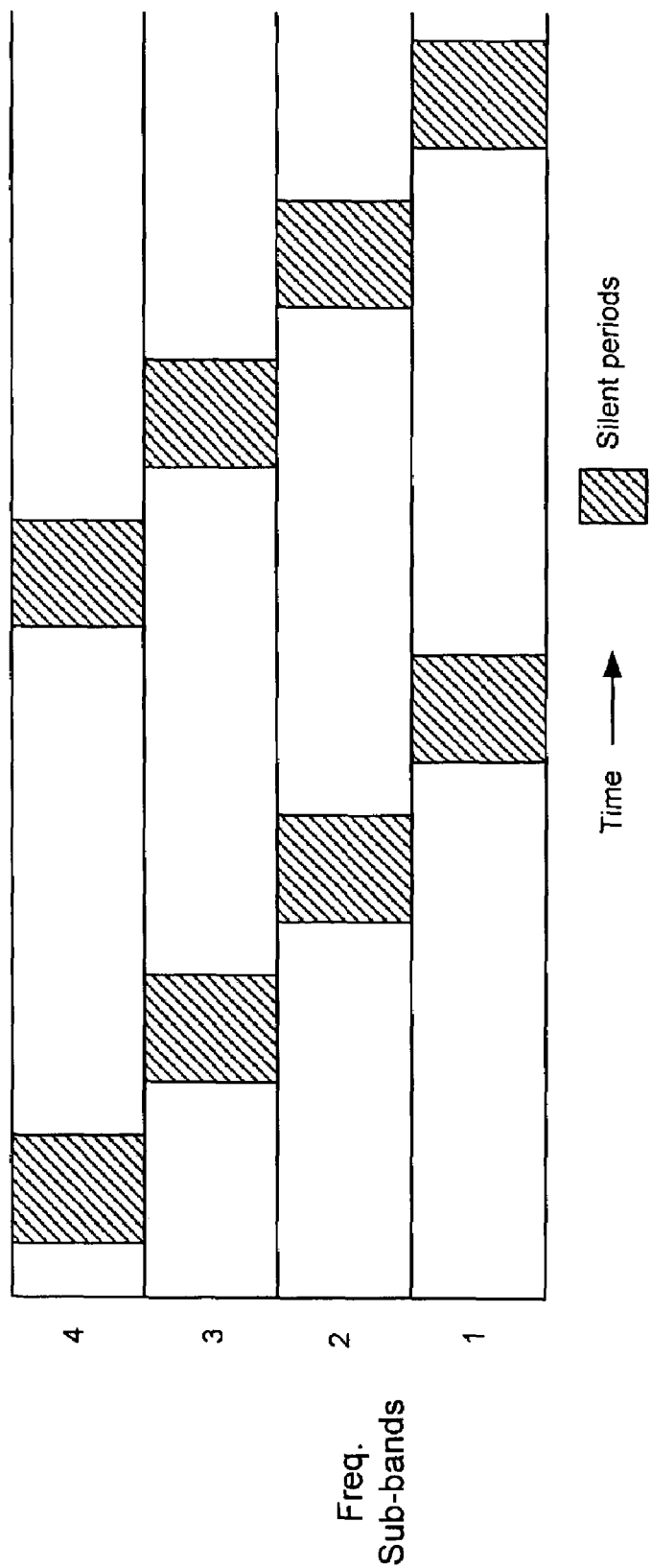
FIG. 2 is an exemplary depiction of a group of frequency sub-bands making up a band of frequencies and showing silent periods walking through the various sub-bands over time.

The silent period may not necessarily apply to all transmissions, but rather at any given time, a smaller band of frequencies could be shut-down system-wide, with the band wide enough to permit a filter on a survey receiver 125 to remove the remaining spurious interference outside the silent band, so that successful surveillance can be carried out. The silent band would then be "walked" over time through all the frequencies of interest as graphically represented in FIG. 2. Further, it may be desired that the silent period be moved around cryptographically in time, frequency, and/or both. FIG. 2 is provided only as an illustrative depiction of the system and method and is not provided as limiting the number of frequency sub-bands, the walk-through process, the assignment of the silent periods, etc.

The receiver of the radio transmitter-receiver itself might provide the frequency surveillance during the quiet period to detect non-system users, or a separate surveillance receiver might be used which is synchronized to the silent periods.

In an exemplary embodiment, a slow frequency hopping system 100 which hops over 512 frequencies is used. As a simple example, the hopping interval may be a fixed one second duration on each frequency, and system synchronization may be by a Rubidium standard clock in each radio, or by means of time from a Global Positioning System (GPS) receiver. Alternatively, the waveform could be self-synchronizing using a master-slave, or other arrangement. These radios may utilize a Carrier Sense Multiple Access (CSMA) protocol, such as a packet format and protocol similar, but not limited to, layer 2 of the IEEE 802.3 protocol (an 802.3-like protocol) to access the channel during each second using Differential Binary Phase Shift Keying (DBPSK) modulation at one million bits per second. The carrier sensing function of the CSMA apparatus and protocol, which detects transmissions by brother CSMA users, should not be confused with the surveillance function during the window of silence, which is designed, ideally, to detect all non-system users and all interference of all modulation types which might be encountered. While the example given below illustrates a CSMA-based system, those skilled in the art will recognize the applicability of the invention to a wide variety of protocols and modulation types. However, for systems which do use CSMA, if the carrier sensing mechanism were expanded to include detection of use or interference by non-system users, then a less capable, but perhaps, useful application of the invention may be used. The modified CSMA would refrain from transmission until the non-system use or interference disappeared, or until a frequency change occurred, after which the carrier sensing would be repeated.

The system may be designed to work over UHF line-of-sight frequencies in the range of 300 to 812 MHz. The system range may be 10 miles, which is a one way propagation time of about 50 microseconds. A 100 bit preamble of a known pattern may precede each 802.3 packet and indicates the beginning of each packet. In an exemplary embodiment, 802.3 packets can range from 64 bytes to 1536 bytes, which is 512 bits to 12,288 bits, which at 1 Mbps is 0.512 milliseconds to 12.288 milliseconds. Suppose the randomization interval during which the IEEE 802.3-like protocol listens before transmission is 20 propagation times, which is 50 microseconds times 20, which is one 1 millisecond. Then each one second timeslot may support several, perhaps a dozen or two, transmissions by the group of radios.

In an exemplary embodiment, the hopping pattern may be controlled by a pseudo-random generator 13 bits in length incremented at the beginning of each second. There are many ways to build pseudo-random number generators. One such way (but not inclusive) would be a feed-back shift register based on a polynomial. If the polynomial has the "maximal length" property, then all possible numbers between zero and $2^{13}$ will eventually be covered before repeating, and so, when used as described below, all possible frequencies will be covered. (Note that such a shift register may be too predictable for military cryptographic use, but does illustrate one way of generating a pseudo-random sequence of numbers.) Each radio may have a register which is synchronized to the others with respect to the starting point and time. For example, in a real system the current second in time is known to all from the clock mentioned above, and at a certain second all units reset their pseudo-random generator to the same starting number.

The most significant 9 bits of the feedback shift register may be used to determine the frequency to which the radio is tuned in one MHz steps starting at 300 MHz. So, the radio may hop pseudo-randomly over 300 to 811 MHz in 512 one MHz steps. The radio may also observe the least significant 4 bits of the random number generator for the all zeros condition which will occur pseudo-randomly averaging 1/16 of the time. When the least significant bits of the random number generator are not all zero, the channel may be used normally to broadcast the CSMA IEEE 802.3 traffic. When the least significant bits of the random number generator are all zero, then all radios may be configured not to transmit, but rather to listen during the next second on that frequency to see if anyone else in the area is trying to use that frequency for some other purpose. If any radio hears any other activity, then within the message contained in the next transmission of that radio, the radio detecting interference indicates to all the other radios that that frequency should not be used. All radios would then subsequently refrain from transmitting when the random number generator indicates that frequency is to be used. The objective may be to avoid interference to the other user, avoid interference from the other user, or both.

One skilled in the art will immediately recognize that the embodiment of the invention discussed above could be much more sophisticated and/or used in a more sophisticated radio system.

In an alternative embodiment, it may be desirable to have more frequencies in the interval and more bits in the pseudo-random feedback shift register. For example if a higher order modulation were used, D4PSK for example, which require only 500 KHz channels, then the interval 300 to 811 MHz would easily support 1024 frequencies. The 512 frequencies actually to be used would be determined indirectly by using 9 bits of the random number to look up the frequency to be used in a table of 512 frequencies. However, during the quiet time 10 bits of the random number generator would be used and the other 512 inactive frequencies would eventually be scanned. Thus, when interference was found on an active frequency, one of the pre-scanned, interference-free inactive frequencies could be proposed as a replacement. Another improvement would be to be able to return to a frequency when the interference disappears.

According to another exemplary embodiment (which may be applicable in military systems) a "cryptographic grade" random number generator, which is known to those skilled in the art, may be used. Further, according to an exemplary embodiment, systems using much faster hopping may also be used.

Another exemplary embodiment may include permanently avoiding putting any frequencies in the above table which are known ahead of time to be used by others in the area—for example television transmissions.

Also, while the embodiment discussed above uses CSMA channel access, it will be understood by those skilled in the art that the silent surveillance window could be incorporated using many other protocols. Moreover, the protocol used by the system need not be CSMA but could be Time Division Multiple Access, master-slave polling, or some other protocol. Those skilled in the art will also realize the protocol need not be frequency hopping in normal operation, and frequency changes need only be made when non-system users or interference is detected according to the teaching of the invention.

While it may be desirable to provide an entirely quiet surveillance window, as discussed above, it may sometimes be desirable to maintain continuous operation with a not entirely quiet window. One method of accomplishing this is to quiet a band of frequencies which is sufficiently wide that the operating frequencies are far enough away that they do not interfere with surveillance. In a simple example, consider a system practicing the invention using 512 adjacent channels in frequency. Channel scanning would be divided into four parts according to the following table. Channel here means a band of frequency spectrum use occupied by the modulation method in use centered on a given frequency. Here we assume 10 channels provide a sufficient guard bandwidth to prevent the detection of self-interference and allow for the detection of non-system users or interference.

TABLE

Scanning 512 channels in Four periods

| Channel set for survey period | Channels remaining in use | Channels surveyed | Channels silent | Guard channels |
| --- | --- | --- | --- | --- |
| 1 | 139-512 | 1-128 | 1-138 | 129-138 |
| 2 | 1-118, and 267-512 | 129-256 | 119-266 | 119-128 and 257-266 |
| 3 | 1-246 and 395-512 | 257-384 | 247-394 | 247-256 and 385-394 |
| 4 | 1-374 | 385-512 | 375-512 | 375-384 |

As the table shows, one quarter of the entire operating bandwidth of 512 channels is surveyed in four survey periods. The system can remain in operation in the channels labeled Channels remaining in use. If more periods are used, fewer channels need be idled. In the limit if 512 survey periods were used and only one channel were surveyed at a time with a 10 channel guard band then only at most 21 channels would be removed from service at a time. The channels scanned could be also be varied cryptographically either by pseudo-randomly selecting a set of channels to be surveyed each time or by pseudo-random selection of the channel sets rather than in using them in a rotating order. To be cryptographically useful, many more than four sets would, of course, be needed. The length of time between changing to a new set need not be strictly periodic, but could also be varied cryptographically.

One skilled in the art will recognize that with only a partial system shutdown for surveillance it will be more difficult to do effective surveillance than during a complete shutdown. The guard channels as explained in the table above will be sufficiently effective in some cases. They will be especially effective when the survey receiver is located some distance from any node which is still partially operating. If a receiver located in a node which is still partially active is to be used for surveillance, perhaps even in an extreme case using the same antenna, then one skilled in the art will recognize that surveillance may require extra filtering on the surveillance receiver, or the surveillance receiver might be interlocked with the co-located transmitter, so that surveillance is performed only during the surveillance window and, in addition, only when the co-located transmitter is not actually operating.

One skilled in the art will recognize that while the invention is described in terms of a conventional radio system, the invention is equally applicable to any shared communications medium including, but not limited to, conventional radio, acoustic, and optical media, and the term radio, as used herein, encompasses any shared communications medium on which the invention is practiced. While the detailed drawings, specific examples and particular formulations given describe preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the communications devices. For example, the type of communications devices used may differ. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A method of modifying a carrier sense multiple access (CSMA) protocol used in a node in a first group of one or more radio nodes each using the CSMA protocol to avoid interference to or from a second group of radio nodes which do not use the CSMA protocol, the method comprising:
   listening in a listening period on a first frequency band for transmission traffic by neighboring radio nodes using the CSMA protocol; and
   identifying, during the listening period, radio traffic on the first frequency band from the second group of radio nodes which do not use the CSMA protocol.

2. The method of claim 1, further comprising:
   waiting to broadcast using the CSMA protocol until the radio traffic on the first frequency band from the second group of radio nodes has stopped.

3. The method of claim 2, further comprising:
   broadcasting by the node in the first group over the first frequency band.

4. The method of claim 2, further comprising:
   switching at least some of the radio nodes in the first group to a second frequency band.

5. The method of claim 4, further comprising:
   stopping broadcast on the second frequency band by the first group of radio nodes.

6. The method of claim 1 further comprising:
   creating a time for a window of radio broadcast silence on at least one of the first frequency band by the first node group.

7. The method of claim 1 comprising:
   surveying the first frequency band during the window of radio broadcast silence to detect traffic.

8. The method of claim 6 further comprising:
   choosing, based on a survey, a radio frequency sub-band for broadcast.

9. The method of claim 6, further comprising:
   repeating the step of creating a time for a window of broadcast silence.

10. The method of claim 9, wherein the repeated windows of broadcast silence are varied cryptographically in time.

11. The method of claim 9, wherein the repeated windows of broadcast silence are varied cryptographically in frequency.

12. The method of claim 9, wherein the repeated windows of broadcast silence are varied cryptographically in both frequency and time.

13. The method of claim 9, wherein the window of broadcast silence is carried out over one or more frequency sub-bands, but less than all of the radio frequency sub-bands which make up the first frequency band.

14. The method of claim 13, wherein the one or more frequency sub-bands over which the window of broadcast silence is carried out, is changed over time.

15. The method of claim 6, wherein the window of broadcast silence is carried out over all of the radio frequency sub-bands which make up the first frequency band.

16. The method of claim 6, wherein the node is configured to broadcast and receive over more than one frequency sub-band, the frequency sub-bands making up the first frequency band.

17. The method of claim 16, wherein the node comprises:
   a radio frequency communication device; and a radio controller;

wherein the controller is configured to provide a repeated silent period, and provide surveillance of the frequency sub-bands to which the transmission silence has been applied to detect traffic on the frequency sub-band.

18. The method of claim 17, wherein the controller is configured to provided the silent period over one or more frequency sub-bands, but less than all of the frequency sub-bands making up the frequency band.

19. The method of claim 18, wherein the one or more frequency sub-bands over which the silent period is carried out, is changed over time.

20. The method of claim 14, wherein the window of broadcast silence is carried out over all of the plurality of radio frequency bands.

21. The method of claim 17, wherein the repeated silent periods are varied cryptographically in time.

* * * * *